United States Patent [19]

Lee et al.

[11] 4,341,695

[45] Jul. 27, 1982

[54] RUBBER MODIFIED TERPOLYMERS WITH IMPROVED HEAT DISTORTION RESISTANCE

[75] Inventors: Yoon C. Lee; Quirino A. Trementozzi, both of Springfield, Mass.

[73] Assignee: Monsanto Company, St. Louis, Mo.

[21] Appl. No.: 927,429

[22] Filed: Jul. 24, 1978

Related U.S. Application Data

[63] Continuation-in-part of Ser. No. 865,049, Dec. 27, 1977, Pat. No. 4,197,376.

[51] Int. Cl.$^3$ .......................... C08K 5/13; C08L 37/00
[52] U.S. Cl. ...................................... 524/342; 525/70; 525/74; 525/80; 525/84; 524/504
[58] Field of Search .................. 260/876 R, 892, 878, 260/45.7 PH, 45.95 B; 525/74, 80, 84, 70

[56] References Cited

U.S. PATENT DOCUMENTS 3,919,354  11/1975  Moore et al. .................... 260/880 R Primary Examiner—Jacob Ziegler
Attorney, Agent, or Firm—David Bennett; William J. Farrington; Paul D. Matukaitis

[57] ABSTRACT

Rubber-modified terpolymers of a monoalkenyl aromatic monomer, an unsaturated dicarboxylic acid anhydride and an alkyl methacrylate are found to possess an unexpectedly high heat distortion temperature over a certain range of composition.

9 Claims, 1 Drawing Figure

RUBBER MODIFIED TERPOLYMERS WITH IMPROVED HEAT DISTORTION RESISTANCE

BACKGROUND OF THE INVENTION

This is a continuation-in-part of U.S. application Ser. No. 865,049, filed Dec. 27, 1977, U.S. Pat. No. 4,197,376.

This invention relates to terpolymers and specifically to styrene/maleic anhydride/methacrylate copolymers having a rubber modifier incorporated therein.

Rubber-modified styrenic polymers, commonly referred to as HIPS are very tough and durable and have seen broad acceptance in a variety of uses such as appliance housings and the like.

However, HIPS begins to soften and lose its dimensional integrity under stress at temperatures below those at which it would be required to operate for a number of significant applications.

A rubber-modified styrenic terpolymer composition has now been discovered that produces a surprising improvement in the heat distortion temperature by comparison with HIPS making it suitable for a wide range of uses for which HIPS is disqualified.

DISCUSSION OF THE PRIOR ART

The influence of maleic anhydride on the heat distortion temperature of a styrenic polymer is very well known in the art and methods of polymerizing styrene and maleic anhydride are described for example in U.S. Pat. Nos. 2,971,939; 3,989,517; 3,336,267 and British Pat. No. 1,234,395.

It is also known that such styrene/maleic anhydride copolymers can be rubber-modified to produce tough copolymers, similar in morphology to conventional HIPS but with a distinctly higher heat distortion temperature. Such products are described for example in British Pat. No. 1,452,141 and U.S. Pat. No. 3,919,354. These patents also disclose the use of termonomers such as methyl methacrylate in such compositions.

It has now been found that if a specified amount of a methacrylate monomer is incorporated in the polymer, a surprising further improvement in the heat distortion temperature of the polymer is obtained without significant sacrifice in other desirable properties. This improvement does not however, extend across the full range of compositions described in the art but appears to be confined to the narrow compositional range hereinbelow specified.

Additionally it is found that the incorporation of the methacrylate termonomer has the effect of raising the tensile strength and the gloss of the rubber modified polymer in a most advantageous manner making the polymeric product most attractive for a broad spectrum of applications.

STATEMENT OF THE INVENTION

The present invention provides a polymeric composition comprising a rubber substrate having a glass transition temperature below 0° C. grafted with a superstrate polymer and dispersed in a matrix polymer both the superstrate and matrix polymers comprising from 45 to 83% by weight of a monoalkenyl aromatic monomer, from 15 to 35% by weight of an unsaturated dicarboxylic acid anhydride and from 2 to 20% by weight of a copolymerizable $C_1$ to $C_3$ alkyl ester of methacrylic acid and wherein the amount of rubber in the composition is from 2 to 30% (ungrafted basis) by weight of the polymer composition.

It has been found that the presence of the $C_1$–$C_3$ alkyl methacrylate component has particularly surprising consequences and that the range described above which is mandated by a combination of factors, defines a group of novel rubber-modified terpolymers with unexpected and advantageous properties.

It is found for example that the incorporation of the methacrylate comonomer increases the distortion temperature under load (DTUL) of the polymer. The effect of maleic anhydride on DTUL was known but it was not known however, that a further improvement can be obtained if a methacrylate comonomer is also present. However, this improvement is only obtained over a narrow range and above about 20% by weight methacrylate in the polymer, the advantage is lost.

A second advantage is that other physical properties such as multiaxial impact strength, tensile strength, elongation at fail and gloss of the polymer apparently increase with the amount of the methacrylate in the composition.

The utility of the above advantages is however, circumscribed by the third factor which is that addition of a methacrylate comonomer is found to reduce the thermal decomposition temperature of the polymer. The effect of this can be controlled to some extent by addition of certain stabilizers but it is found that above about 20% by weight of the methacrylate comonomer it is not possible to obtain a polymer that is stable at its processing temperature for the length of time required for conventional forming processes.

Thus, the interplay of these three factors defines in a totally unexpected fashion a range of rubber-modified terpolymers with very advantageous properties.

The preferred polymer compositions within this range will depend largely on the properties desired. Generally, however, the polymers containing from 4 to 10% by weight of the methacrylate comonomer are preferred. This is because the heat distortion temperature, as is explained later, initially increases rapidly with methacrylate content to a broad peak between about 7 and 15% content and thereafter begins a gradual decline. Thus, roughly the same improvement is generally obtained at 7% as at 15% methacrylate content. Additionally, it is preferred to retain the thermal stability as high as possible so as to permit more flexibility in the application of forming processes to the polymers.

POLYMER COMPOSITION

The polymeric composition of the invention comprises a rubber substrate polymer having a glass transition temperature (Tg) below 0° C. grafted with a superstrate polymer and dispersed in a matrix polymer, the superstrate and the matrix polymers each comprising from 45 to 83% (preferably from 50 or 60 to 75%) by weight of a monoalkenyl aromatic monomer, from 15 to 35% (preferably 20–30%) by weight of an unsaturated dicarboxylic acid anhydride, and from 2 to 20% (preferably 4 to 10%) by weight of a $C_1$ to $C_3$ alkyl methacrylate ester, the amount of rubber in the composition, calculated as ungrafted substrate, being from 2 to 30% of the composition weight.

The rubber substrate component of the polymeric composition can be selected from a wide range of alternatives including butadiene polymers and copolymers, particularly the so-called "high-cis" diene rubbers which contain at least 90% by weight of cis-1,4- polybutadiene units, polyisoprene, polychloroprene, polyacrylate rubbers, and ethylene/propylene/diene rubbers (EPDM), polypentenamer and ethylene/vinyl acetate rubbers. Copolymers of cyclopentene with a minor proportion of a non-cyclic α olefin such as for example a copolymer of 55 to 95% of cyclopentene with from 5 to 45% of ethylene are also useful. Other rubbers which have a Tg below 0° C. and which may be grafted with the monomers used to produce the polymeric composition can readily be supplied by the skilled reader. The preferred rubbers have a Tg below about −30° C. and the most preferred are polybutadiene, particularly high-cis polybutadiene and copolymers of butadiene with up to 40% by weight of a styrene or acrylonitrile comonomer.

The monoalkenyl aromatic monomer is preferably styrene but styrene derivatives such as alpha-methylstyrene, chlorostyrene, 2,4-dichlorostyrene and 2-chloro-4-methylstyrene may be substituted for styrene in whole or in part if desired.

The unsaturated dicarboxylic acid anhydride is most preferably maleic anhydride though any of the homologues of maleic anhydride such as itaconic, citraconic and aconitic anhydrides can also be used.

The polymeric composition further comprises a $C_1$ to $C_3$ alkyl ester of methacrylic acid. The methacrylic ester can be methyl methacrylate, ethyl methacrylate or propyl methacrylate. The preferred copolymerizable monomer is methyl methacrylate.

The polymeric composition is conveniently prepared by dissolving the rubber in a solution of the monoalkenyl aromatic component and the methacrylate ester in a suitable solvent, and then polymerizing the solution with the anhydride component in the manner described in, for example, U.S. Pat. No. 2,971,939, U.S. Pat. No. 3,336,267 and U.S. Pat. No. 3,919,354 which are incorporated herein by reference.

A suitable polymerization schedule can be devised on the basis of the relative reactivities of the monomers. Typical schedules involve preparing an initial reaction mixture comprising a solvent, the bulk of the alkenyl aromatic monomers, a very small amount (or none) of the anhydride monomer and the major proportion of the methacrylate termonomer. The rubber is dissolved in this mixture and the balance of the monomers is added slowly during the polymerization.

The amount of rubber substrate (ungrafted basis) in the polymeric composition, which includes the grafted substrate and any matrix polymer present, is in the range from 2 to 30% by weight based on the weight of the polymeric composition. Preferably, however, the rubber substrate represents from 5 to 25% of the weight of the polymeric composition.

Since as has been indicated above, the addition of methyl methacrylate gives rise to reduction in the temperature at which thermal decomposition of the polymer begins, it is advantageous to incorporate an antioxidant stabilizer into the composition to provide an added degree of protection during processing.

In protecting the polymer against thermal degradation, it is important from a practical point of view that the stability obtained has a reasonable duration. In the laboratory stability is often judged by the performance of the polymer in the molding of a small test-piece. In a commercial operation however, the polymer may well spend several minutes at molding temperatures and an acceptable polymer has to have stability not only at high temperatures but for prolonged periods at high temperatures.

A wide range of antioxidant stabilizers for styrenic polymers is available but particularly satisfactory results can be obtained using 1,3,5-trimethyl-2,4,6-tris[3,5-ditert-butyl-4-hydroxybenzyl]benzene and 2,2′-methylene-bis(4-methyl-6-tert-butyl phenol)terephthalate. The rubber component usually requires a different stabilizer such as a tris(alkylphenyl)phosphite though the prior art can supply others that would be effective.

The total amount of stabilizer that may be used is not critical but typically up to 5% by weight based on the total composition is found to be adequate. In general 0.1 to 2% is the range chosen for practical advantage.

The polymeric composition can contain other additives such as for example, additional ungrafted rubber components such as the so-called block rubbers and radial block rubbers, flame retardants, smoke suppressants, U.V. stabilizers, lubricants, antistatic additives, colorants, fillers and the like.

DESCRIPTION OF THE DRAWING

The effect of varying the methacrylate content of the terpolymer of the invention is graphically demonstrated by the drawing attached hereto.

DESCRIPTION OF THE PREFERRED EMBODIMENTS

Figure 1:
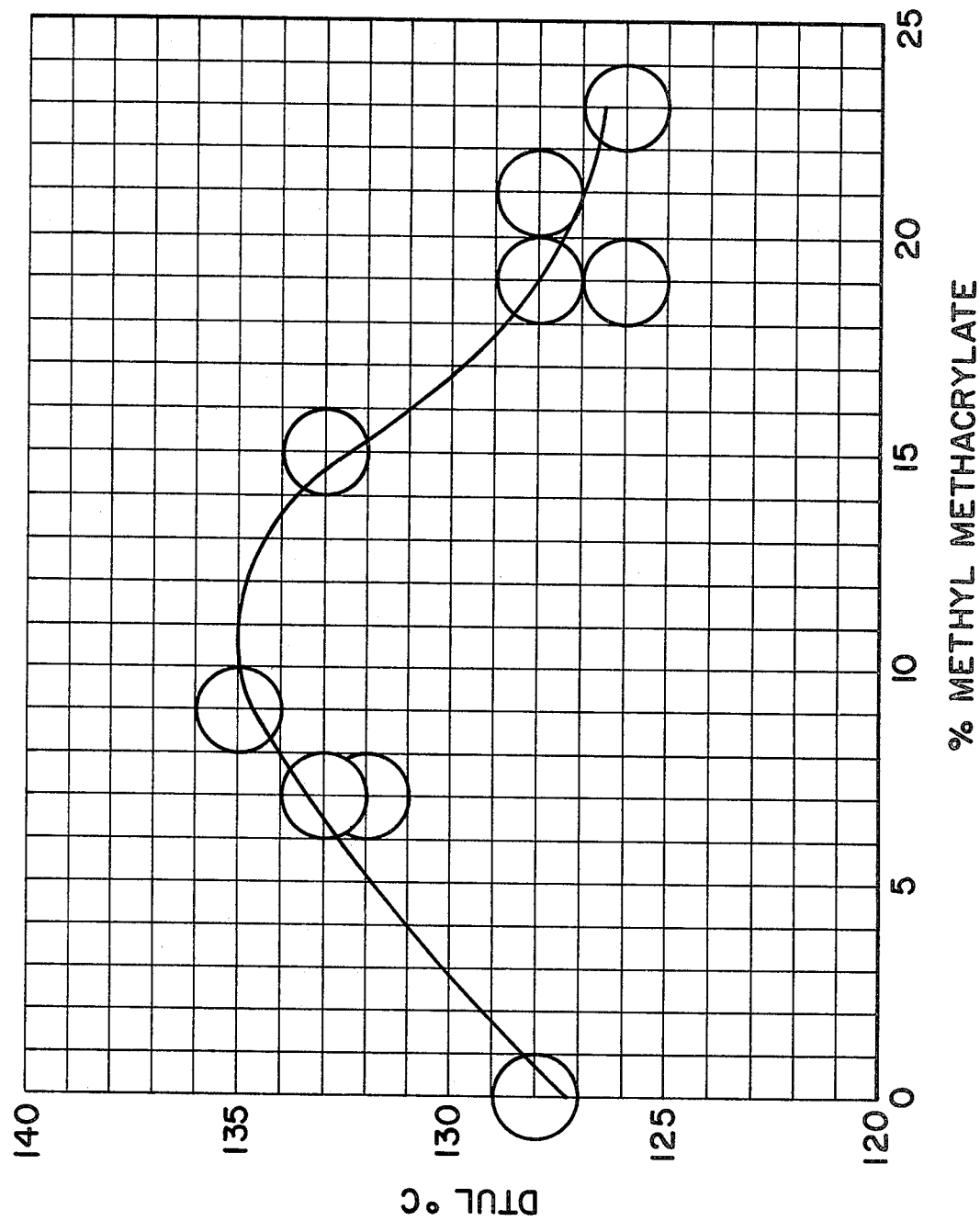
FIG. 1 represents a graph plotting the change in DTUL with methacrylate content. The results plotted are those set forth in Example 9.

The present invention is further described by reference to the following Examples which are for the purposes of illustration only and are not intended to imply any limitation of the scope of the invention.

The polymer compositions are described on the basis of a combination of elemental analysis and titrimetric analysis techniques. The rubber concentration is determined on the basis of material balances in the polymer composition. Unless otherwise stated the rubber used was a medium-cis polybutadiene rubber available from Firestone Corp. under the trade name "Diene 55".

The Examples illustrate the results of varying the amount of the methacrylate ester in the composition and the surprising advantages obtained by maintaining the level in the range of 2 to 20% by weight.

In each Example the components were formed into samples which were then tested to determine the distortion temperature under load (DTUL) under a load of 18.6 kg/sq.cm. (ASTM D-648) and in some cases the Izod Impact Strength, (ASTM D-256) and/or the tensile strength or elongation at fail (ASTM D-638).

In some Examples the multiaxial impact strength is shown. This is commonly called the F.D.I. and is measured according to ASTM D-1709 on a sample 2.9 mm in thickness.

The Izod impact strengths were measured using 3.2×12.7×63.5 mm unannealed compression molded samples, notched 2.54 mm.

The DTUL values given are for 3.2×12.7×127 mm unannealed compression molded samples tested under a 18.6 kg/sq.cm. stress.

Unannealed compression molded samples were chosen in preference to injection molded samples so as to eliminate the variations that occur in the preparation of injection molded samples which become partially oriented during the forming process. The choice of unannealed compression molded samples which are not oriented during formation, eliminates one result-affecting variable and makes the comparison more significant.

EXAMPLES 1-3

These Examples describe the production of rubber-modified polymers of styrene, maleic anhydride and methyl methacrylate.

The process described below is that used in Example 1 but essentially the same process was used in the other Examples with the difference that the initial monomer charge and the late added charge were changed in accordance with a computer model based on monomer reactivities to obtain polymers of different compositions. Typical late addition schedules of specified polymers predicted on the basis of the model are shown in Table 1.

An agitated resin kettle was charged with 316 g. of styrene, 32.6 g. of methylmethacrylate, 0.5 g. of tris-nonylphenyl phosphite (a stabilizer for the rubber) and a solvent mixture consisting of 50 g. of methyl ethyl ketone (MEK) and 75 g. of toluene. In this mixture were dissolved 44.2 g. of polybutadiene rubber.

A solution of 0.6 g. of azobisisobutyronitrile (AIBN) and 3.2 g. of maleic anhydride in 30 ml. of MEK was prepared. 5 Ml of this solution were added to the solution in the resin kettle and the rest was added at a rate of 3 ml/hour thereafter.

The reaction mixture was raised to 85° C. and maintained at that level while late addition of a solution of 97 g. of maleic anhydride and 15 g. of methyl methacrylate in 97 g. of MEK was begun. The late addition was continued over a 6½ hour period. After addition was complete the reaction was held at the reaction temperature for a further hour before 0.5 g. of hydroquinone was added to short-stop the reaction.

The polymer was then separated from the solvent and residual monomer, dried, blended with 1,3,5-trimethyl-2,4,6-tris(3,5-di-tert-butyl-4-hydroxybenzyl)benzene (antioxidant) and molded into samples for evaluation.

TABLE I

LATE MONOMER ADDITION SCHEDULE

| Target Polymer Composition (S/MA/MMA) | Initial Charge (S/MA/MMA) | Late Addition (S/MA/MMA) |
|---|---|---|
| 56.8/26.8/16.4 | 34.4/2.5/16.4 | 22.4/22.2/0 |
| 61.3/24/14.7 | 49.2/2.1/13.7 | 12.1/21.9/0 |
| 72/22/6 | 72/1.5/5.1 | 0/20.5/0.9 |
| 30/35/35 | 0/35/18.7 | 30/0/16.3 |
| 65/25/10 | 60/2.1/10 | 5/22.9/0 |
| 70/20/10 | 70/1.4/8.8 | 0/18.6/1.2 |
| 65/15/20 | 65/1.3/19.2 | 0/13.7/0.8 |
| 60/30/10 | 40.6/2.6/10 | 10.4/27.4/0 |

In each case the amounts given are percentages by weight based on the total final polymer weight.

The results obtained in Examples 1-3 are set forth in Table II below. Polymer (a) was obtained using a 65/25/10 target polymer addition schedule; polymers (b) and (c) used the 56.8/26.8/16.4 schedule.

TABLE II

COMPOSITION AND PROPERTIES OF S/MA/MMA (RUBBER-MODIFIED) - POLYMERS

| Polymer* | Example 1 | Example 2 | Example 3 |
|---|---|---|---|
| Composition in % by weight S/MA/MMA | | | |
| a. 68/26/6 | 100 | — | — |
| b. 59/26/15 | — | 100 | — |
| c. 56/25/19 | — | — | 100 |
| % Rubber (total) | 14.1 | 13.1 | 12.6 |
| Izod Impact Strength J/m notch × 10² | 0.78 | 0.73 | 1.01 |
| DTUL in °C. | 133 | 132 | 127 |

*Each polymer was formed by polymerizing the monomers in the presence of polybutadiene using the technique described above. The proportions quoted are those determined by analysis of the polymer composition.

The above results show that around 20% the DTUL improvement is substantially lost.

EXAMPLES 4-5

These Examples illustrate the use of a different catalyst known to favor grafting in the production of a rubber-modified copolymer of styrene, maleic anhydride and methyl methacrylate and compare the result with a polymer containing no methyl methacrylate.

The process described in Example 1 was followed except that the catalyst was changed from azobisisobutyronitrile to a mixture of tertiary butyl peroctoate and tertiary butyl peracetate. The results obtained are set forth in Table III below. Example 5 is for the sake of comparison and shows the results obtained in the absence of the methyl methacrylate component.

TABLE III

| Polymer Components (parts by weight) | Example 4 | Example 5 (Comparative) |
|---|---|---|
| RM-S/MA/MMA 67/26/7 polymerized in presence of polybutadiene | 100 | — |
| RM-SMA (76/24) | — | 100 |
| % Rubber | 11.3 | 16.6 |
| Properties | | |
| Izod Impact Strength J/m notch × 10² | 0.78 | 1.01 |
| % Elongation at fail | 22% | 3% |
| DTUL °C. | 131 | 123 |

Comparison of Examples 1 with 4 shows that using the peracetate catalyst it is possible to get comparable impact strengths while using a smaller amount of total rubber.

Comparison of the RM-SMA with RM/S/MA/MMA shows the advantage of having the MMA present in terms both of DTUL, and percentage elongation at fail.

EXAMPLE 6

This Example shows the advantages of RM-S/MA/MMA terpolymers over the corresponding RM-SMA polymers.

The compositions compared were as follows:
RM-SMA 76/24-S/MA polymerized in the presence of 16.6% polybutadiene rubber.
RM-S/MA/MMA 67/26/7-S/MA/MMA polymerized in the presence of 13.9% polybutadiene rubber.

Tensile strength is measured by the method of ASTM D-638. Unannealed compression molded samples were 3.2×12.7×127 mm thickness samples. Gloss was assessed by visual inspection. Injection molded samples were 12.7×12.7×127 mm. The results are given in Table IV below.

TABLE IV

|  | RM-SMA | RM-S/MA/MMA |
|---|---|---|
| DTUL (°C.) (Comp. molded) | 123 | 130 |
| Tensile Strength at fail (Inj. molded) kg/sq.cm. | 228.2 | 337.4 |
| Gloss | dull | fair |
| % Elongation at fail | 3 | 23 |
| F.D.I., Joules | 5.4 | 27 |

From these results it can be seen that distinct advantages in terms of physical properties are obtained by including methyl methacrylate as a termonomer in terms of heat distortion temperature, tensile strength and gloss of the final product.

EXAMPLES 7–8

These Examples illustrate the use of a polypentenamer, (PP), a homopolymer of cyclopentene, to replace the polybutadiene used in the previous Examples.

The compositions described in Table V below were made up using the following polymers.

PPM-S/MA A 75/25 SMA polymer polymerized in the presence of a polypentenamer using a mixture of tertiary butyl peracetate and tertiary butyl peroctoate as the catalyst/initiator.

PPM-S/MA/MMA A 66/25/9 S/MA/MMA polymerized in the presence of a polypentenamer using a mixture of tertiary butyl peracetate and tertiary butyl peroctoate as the catalyst/initiator.

Example 7 is for the purposes of comparison with the polymer of the invention described in Example 8.

TABLE V

| Polymer Composition Parts by Weight | Example 7 | Example 8 |
|---|---|---|
| PPM-S/MA | 100 | — |
| PPM-S/MA/MMA | — | 100 |
| % Rubber | 13.8 | 14.7 |
| Izod Impact Strength J/m notch × 10$^2$ | 0.86 | 0.89 |
| DTUL in °C. | 128 | 133 |

As can be seen from the above, the substitution of a cyclopentene homopolymer for polybutadiene produces very comparable results indicating that the effects shown do not depend on the use of polybutadiene.

EXAMPLE 9

This Example sets forth the comparative data upon which FIG. 1 is based.

In each case the polymer was prepared in the manner described in Example 1 except for the addition of 1,3,5-trimethyl-2,4,6-tris(3,5-di-tert-butyl-4-hydroxybenzyl)-benzene as antioxidant and the use of the catalyst combination of Example 4.

The intention was to produce a series of polymers differing only in methyl methacrylate content and styrene content. In practice this is very difficult because the initial feed can only be roughly tailored to produce a desired composition without considerable trial and error testing.

It has, however, been found that DTUL increases by 0.7° C. for each 1% decrease in the amount of rubber in the polymer and it increases 1.7° C. for every 1% rise in the proportion of maleic anhydride in the polymer.

Thus, in Table VI (below) the figures for DTUL actually measured are followed by a figure in parentheses which is the DTUL corrected to 14.0% rubber and 26% maleic anhydride and expressed to the nearest degree centigrade.

TABLE VI

| Base Rubber | % Maleic Anhydride | % Methyl Methacrylate | DTUL, °C. | Izod J/m notch × 10$^2$ | Test Composition |
|---|---|---|---|---|---|
| 16.6 | 24 | 0 | 123(128) | 1.14 | A |
| 13.1 | 26 | 7 | 133(132) | 0.97 | B |
| 14.1 | 26 | 7 | 133(133) | 1.08 | C |
| 14.7 | 25 | 9 | 133(135) | 0.89 | D |
| 13.6 | 26 | 15 | 133(133) | 1.04 | E |
| 12.6 | 26 | 19 | 127(126) | 1.11 | F |
| 14.4 | 26 | 19 | 128(128) | 1.11 | G |
| 15.1 | 28 | 21 | 131(128) | 1.22 | H |
| 13.4 | 26 | 23 | 126(126) | 1.49 | I |

From the above Table VI it can be seen that around 15% methyl methacrylate a gradual decrease in DTUL begins. A graph of these (corrected) results appears in FIG. 1.

It can also be seen that although the effect is slightly distorted by a non-constant rubber level, the increasing methyl methacrylate content leads to a clear improvement in impact strength.

EXAMPLE 10

This Example shows the decrease in temperature at which thermal degradation begins with the increase of the methyl methacrylate content.

Polymers having the compositions described below were subjected to thermogravimetric analysis using a duPont Model 950 Thermogravimetric Analyzer. The heating rate used was 20° C. per minute. The "initial decomposition temperature" (IDT) was that at which 0.5% weight loss was observed.

The compositions were tested: (A) without a stabilizer; (B) using 0.5% by weight of a 2,6-di-tertiary butyl-p-cresol stabilizer; and (C) using a mixture of 0.5% by weight of each of the stabilizer of (B) and 1,3,5-trimethyl-2,4,6-tris(3,5-di-tert-butyl-4-hydroxybenzyl)-benzene.

The results obtained are set forth in Table VII.

TABLE VII
THERMOGRAVIMETRIC ANALYSIS OF RM-S/MA/MMA POLYMERS

| % Rubber | % MMA | IDT A | B | C |
|---|---|---|---|---|
| 11.3 | 7 | 295–300° C. | 300° C. | 305° C. |
| 14.5 | 12 | 260–265° C. | 265° C. | 300° C. |
| 13.1 | 15 | 250–255° C. | 255° C. | 295° C. |
| 12.6 | 19 | 225–230° C. | 230° C. | 295° C. |
| 15.4 | 25 | 225–230° C. | — | 270° C. |

The results in Table VII show that the temperature at which the polymer begins to decompose decreases with increasing MMA content but that the choice of a suitable stabilizer can be very effective in controlling this trend below about 20% methyl methacrylate content.

EXAMPLES 11–16

These Examples show the improvement obtained using a high-cis rubber, that is a polybutadiene containing over 90% of cis 1,4-polybutadiene units.

The polymer used in Example 11 was prepared as follows:

An agitated resin kettle was charged with 323 g. of styrene, 15 g. of methyl methacrylate, 0.1 g. of tris-nonylphenyl phosphite (a stabilizer for the rubber) and a solvent mixture consisting of 50 g. of methyl ethyl ketone (MEK) and 75 g. of toluene. In this mixture were dissolved 54 g. of a high cis polybutadiene rubber. After the rubber was completely dissolved, a solution of 4 g. of maleic anhydride in 25 g. of MEK was added. The reaction mixture was raised to 85° C. and maintained at that level for the entire reaction period. One ml. of 75% solution of tertiary butyl peracetate in mineral spirit and 0.05 ml. of tertiary butyl peroctoate were added prior to late addition of a solution of 73 g. of maleic anhydride, and 7.3 g. of methyl methacrylate in 97.2 g. of MEK. The late addition was continued over a 6½ hour period. Slug additions of 0.1 ml of t-butyl peroctoate were made at 1½, 3, 4½ hours during the late monomer addition. After addition was complete the reaction was held at the reaction temperature for a further 45 minutes before 0.5 g. of hydroquinone was added to short-stop the reaction.

The polymer was then separated from the solvent and the residual monomer removed by a conventional method. The isolated polymer was blended with any desired additives, such as stabilizers, and compression molded into samples for evaluation.

All the other polymers described in the Examples were prepared in essentially the same manner with the necessary adjustment to monomer and rubber charges being determined by the desired composition of the final polymer.

The compositions contained 0.3% by weight of 1,3,5-trimethyl-2,4,6-tris[3,5-di-tert-butyl-4-hydroxybenzyl]-benzene as an antioxidant stabilizer.

Examples 11–13 and 16 (Comparative) used high-cis rubber while Examples 14 and 15 (Comparative) used the medium-cis rubber described above.

TABLE VIII

TERPOLYMERS REINFORCED WITH HIGH CIS RUBBER

| Example | Polymer Composition S/MA/MMA | % Polybutadiene high cis(1) | % Polybutadiene medium cis(2) | Izod, J/m notch × $10^2$ | Multiaxial* Toughness (FDI), Joules | % Elongation | DTUL °C. |
|---|---|---|---|---|---|---|---|
| 11 | 69/24/7 | 15.4 | — | 1.59 | 28 | 20 | 130 |
| 12 | 68/22/10 | 15.4 | — | 1.65 | — | — | 128 |
| 13 | 60/26/14 | 14.6 | — | 1.58 | — | — | 130 |
| 14 | 66/25/9 | — | 14.7 | 0.89 | — | — | 133 |
| 15 C | 76/24/0 | — | 16.6 | 1.13 | 5.4 | 3 | 123 |
| 16 C | 75/25/0 | 17 | — | 1.46 | 13.6 | 19 | 125 |

*Multiaxial Impact (FDI) determined according to ASTM D-1709 on a 2.9 mm thickness sample.
(1) A polybutadiene rubber containing greater than 90% cis 1,4-polybutadiene units available from Polysar Corporation under the trade name Taktene 1202.
(2) A medium-cis polybutadiene rubber available from Firestone Corporation under the trade name Diene 55.

Comparison of the Izod strengths with those given in Table VI shows that a very significant improvement in impact strength is obtained using this high-cis rubber. Surprisingly, the effect observed is greater where the polymer contains the methacrylate then where it does not.

EXAMPLES 17 to 21

These Examples show the effect of the methyl methacrylate content of the polymer on its thermal stability.

Polymers having the compositions given below were prepared using the method described in Example 11 with the necessary adjustments of monomer charge according to the computer schedule described in Example 1. No antioxidant stabilizer was used.

Each sample was placed in the barrel of a capillary rheometer maintained at a constant temperature and extruded after a given residence time. The matrix phase of the polymer was separated from the grafted rubber phase and was analyzed for its maleic anhydride content by a standard titrimetric technique.

The measurements were made for the original polymer and the polymer after 5 minutes residence in the rheometer barrel, at both 260° C. and 274° C. The results are given in Table IX below.

TABLE IX

ISOTHERMAL STABILITY

| Example | Composition S/MA/MMA | Time Mins. | 260° C. % MA | 260° C. % Change | 274° C. % MA | 274° C. % Change |
|---|---|---|---|---|---|---|
| 17 | 68.3/24.7/7 | 0 | 24.7 | | 24.7 | |
|  |  | 5 | 24.6 | 0.4 | 23.8 | 3.6 |
| 18 | 59/26/15 | 0 | 25.8 | | — | |
|  |  | 5 | 25.3 | 1.9 | — | — |
| 19 | 51.8/27.2/21 | 0 | 27.2 | | 27.2 | |
|  |  | 5 | 26.6 | 2.2 | 25.6 | 5.9 |
| 20 | 50.4/26.6/23 | 0 | 26.6 | | 26.3 | |
|  |  | 5 | 25.9 | 2.6 | 24.5 | 6.8 |
| 21 | 50.3/24.7/25 | 0 | 24.7 | | 24.7 | |
|  |  | 5 | 23.8 | 3.6 | 22.7 | 8.1 |

As can readily be seen, the higher the proportion of MMA and the higher the temperature, the more readily does the decomposition of the polymer occur.

The above Examples are included to illustrate the scope of the invention and are not intended to imply any limitation thereof. It is foreseen that many minor variations and modifications could be made without departing from the essential spirit of the invention and it is intended that all such variations and modifications should be embraced within its general purview.

What is claimed is:

1. A polymeric composition produced by polymerizing, in the presence of a rubber having a glass transition temperature below 0° C., a monoalkenyl aromatic monomer, an unsaturated dicarboxylic acid anhydride and a $C_1$ to $C_3$ alkyl methacrylate to produce a composition comprising from 2 to 30% of the rubber, (ungrafted basis), grafted with a superstrate polymer and dispersed in a matrix polymer, the superstrate and matrix polymers each comprising from 45 to 83% of the monoalkenyl aromatic monomer, from 15 to 35% of the unsaturated dicarboxylic acid anhydride and from 2 to 20% of the $C_1$ to $C_3$ alkyl methacrylate, all percentages being by weight.

2. The composition according to claim 1 in which the amount of $C_1$ to $C_3$ alkyl methacrylate is from 4 to 10% by weight in both the superstrate and matrix polymers.

3. The composition according to claim 1 in which the $C_1$ to $C_3$ alkyl methacrylate is methyl methacrylate.

4. The composition according to claim 1 in which the rubber substrate is a polybutadiene comprising at least 90% of cis 1,4-polybutadiene units.

5. The composition according to claim 1 in which the rubber is polypentenamer.

6. A polymeric composition produced by polymerizing, in the presence of a rubber having a glass transition temperature below $-30°$ C., a monoalkenyl aromatic monomer, an unsaturated dicarboxylic acid anhydride and a $C_1$ to $C_3$ alkyl methacrylate to produce a composition comprising from 5 to 25% of the rubber (ungrafted basis), grafted with a superstrate polymer and dispersed in a matrix polymer, both superstrate and matrix polymers comprising from 50 to 75% of the monoalkenyl aromatic monomer, from 20 to 30% of the unsaturated dicarboxylic acid anhydride and from 2 to 20% of the $C_1$ to $C_3$ alkyl methacrylate, all percentages being by weight.

7. The composition of claim 6 that includes up to 5% by weight of an effective antioxidant stabilizer.

8. The composition of claim 7 in which the antioxidant stabilizer is a combination comprising a rubber stabilizer and 1,3,5-trimethyl-2,4,6-tris(3,5-di-tert-butyl-4-hydroxybenzyl)benzene.

9. A polymeric composition produced by polymerizing, in the presence of a polybutadiene rubber having at least 90% cis 1,4-butadiene units, a monomer composition consisting of styrene, maleic anhydride and methyl methacrylate to produce a composition comprising from 2 to 30% of the polybutadiene rubber, (ungrafted basis), grafted with a superstrate polymer and dispersed in a matrix polymer, said superstrate and matrix polymers each comprising from 60 to 75% of styrene, 20 to 30% of maleic anhydride and 4 to 10% of methyl methacrylate, and incorporating in said composition up to 2% of 1,3,5-trimethyl-2,4,6-tris(3,5-di-tert-butyl-4-hydroxybenzyl) benzene; all percentages being by weight.

* * * * *